(12) United States Patent
Pan et al.

(10) Patent No.: US 11,535,235 B2
(45) Date of Patent: Dec. 27, 2022

(54) SIMPLIFIED CONTROL FOR OPTIMIZED HYBRID VEHICLE POWERTRAIN OPERATION

(71) Applicants: Robert Bosch GmbH, Stuttgart (DE); THE REGENTS OF THE UNIVERSITY OF MICHIGAN, Ann Arbor, MI (US)

(72) Inventors: Ziheng Pan, Farmington Hills, MI (US); Shyam Jade, Plymouth, MI (US); Huei Peng, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 17/088,040

(22) Filed: Nov. 3, 2020

(65) Prior Publication Data
US 2021/0188242 A1 Jun. 24, 2021

Related U.S. Application Data

(60) Provisional application No. 62/951,413, filed on Dec. 20, 2019.

(51) Int. Cl.
*B60W 20/13* (2016.01)
*B60W 10/06* (2006.01)
*B60W 10/08* (2006.01)

(52) U.S. Cl.
CPC ............ *B60W 20/13* (2016.01); *B60W 10/06* (2013.01); *B60W 10/08* (2013.01);
(Continued)

(58) Field of Classification Search
CPC ...... B60W 20/13; B60W 20/10; B60W 10/06; B60W 10/08; B60W 2510/244; B60W 2530/00; B60W 2050/0026; B60W 2540/10; B60W 2540/12; B60W 2710/066; B60W 2710/083; B60W 2720/30
See application file for complete search history.

(56) References Cited

U.S. PATENT DOCUMENTS

| | | | |
|---|---|---|---|
| 7,360,615 | B2 | 4/2008 | Salman et al. |
| 7,758,467 | B2 | 7/2010 | Ashizawa et al. |

(Continued)

OTHER PUBLICATIONS

Pan et al., "Battery State-of-Charge Pulse-and-Glide Strategy Development of Hybrid Electric Vehicles for VTS Motor Vehicle Challenge", IEEE Vehicle Power and Propulsion Conference, 2018, 7 pages.

(Continued)

*Primary Examiner* — George C Jin
(74) *Attorney, Agent, or Firm* — Michael Best & Friedrich LLP (57) ABSTRACT

Methods and systems for calibrating a hybrid vehicle system for simplified control of the powertrain to optimize fuel efficiency of the hybrid vehicle and for operating a hybrid vehicle powertrain accordingly. The optimization mechanism reduces the optimized control problem to a single degree-of-freedom. Accordingly, during real-time operation of the hybrid vehicle, the system is able to quickly identify and apply optimized operating settings for a particular driver demand and, in some implementations, to provide a particular rate of change of the state-of-charge of the battery of the hybrid vehicle.

20 Claims, 6 Drawing Sheets

(52) U.S. Cl.
CPC ... *B60W 2510/244* (2013.01); *B60W 2530/00* (2013.01); *B60W 2556/45* (2020.02)

(56) References Cited

U.S. PATENT DOCUMENTS

| | | | |
|---|---|---|---|
| 7,891,450 | B2 | 2/2011 | Soliman et al. |
| 8,565,952 | B2 | 10/2013 | Mehr et al. |
| 9,067,589 | B1 | 6/2015 | Zhao et al. |
| 9,114,806 | B2 * | 8/2015 | Wang ............... B60W 20/12 |
| 9,193,351 | B2 * | 11/2015 | Zhao ............... B60W 10/06 |
| 9,409,565 | B2 | 8/2016 | Bureau et al. |
| 9,545,915 | B2 * | 1/2017 | Phillips ............ B60W 20/12 |
| 9,592,817 | B2 | 3/2017 | Yamazaki et al. |
| 9,718,462 | B2 | 8/2017 | Yamazaki et al. |
| 9,849,869 | B2 | 12/2017 | Frank et al. |
| 2011/0166731 | A1 | 7/2011 | Kristinsson et al. |
| 2012/0010767 | A1 | 1/2012 | Phillips et al. |
| 2013/0024055 | A1 | 1/2013 | Hysko et al. |
| 2014/0228168 | A1 | 8/2014 | Kaufman et al. |
| 2017/0176195 | A1 | 6/2017 | Rajagopalan et al. |
| 2018/0154898 | A1 | 6/2018 | Wrobel |
| 2019/0063354 | A1 | 2/2019 | Augst |

OTHER PUBLICATIONS

Li et al., "Minimum Fuel Control Strategy in Automated Car-Following Scenarios", IEEE Transactions on Vehicular Technology, 2012, vol. 61, No. 3., pp. 998-1007.

Li et al., "Effect of Pulse-and-Glide Strategy on Traffic Flow for a Platoon of Mixed Automated and Manually Driven Vehicles", Computer-Aided Civil and Infrastructure Engineering, vol. 30, 2015, pp. 892-905.

Xu et al., "Fuel-Optimal Cruising Strategy for Road Vehicles With Step-Gear Mechanical Transmission", IEEE Transactions on Intelligent Transportation Systems, vol. 16, No. 6, 2015, pp. 3496-3507.

Xu et al., "Fuel-Saving Cruising Strategies for Parallel HEVs", IEEE Transactions on Vehicular Technology, vol. 65, No. 6, 2016, pp. 4676-4686.

Muller et al., "Coasting—Next Generation Start/Stop Systems", Powertrain Cover Story, 2010, vol. 72, pp. 14-18.

Serrao et al., "ECMS as a realization of Pontryagin's minimum principle for HEV control", American Control Conference, 2009, pp. 3964-3969.

Stockar et al., "Energy-Optimal Control of Plug-in Hybrid Electric Vehicles for Real-World Driving Cycles", IEEE Transactions on Vehicular Technology, vol. 60, No. 7, 2011, pp. 2949-2962.

Lin et al., "Power Management Strategy for a Parallel Hybrid Electric Truck", IEEE Transactions on Control Systems Technology, vol. 11, No. 6, 2003, pp. 839-849.

Niu et al., "Intelligent HEV Fuzzy Logic Control Strategy Based on Identification and Prediction of Drive Cycle and Driving Trend", World Journal of Engineering and Technology, vol. 3, 2015, pp. 215-226.

Sun et al., "Investigating adaptive-ECMS with velocity forecast ability for hybrid electric vehicles", Applied Energy, vol. 185, 2017, pp. 1644-1653.

Onori et al., "On Adaptive-ECMS strategies for hybrid electric vehicles", IFP Energies Nouvelles, 2011, 7 pages.

Leroy et al., "Toward Real-Time Optimal Energy Management of HEV Powertrains Using Stochastic Dynamic Programming", IEEE Vehicle Power and Propulsion Conference, 2012, pp. 383-388.

Mueller et al., "Next Generation Engine Start/Stop Systems: Freewheeling", SAE Int. J. Engines, vol. 4, No. 1, 2011, pp. 874-887.

* cited by examiner

SIMPLIFIED CONTROL FOR OPTIMIZED HYBRID VEHICLE POWERTRAIN OPERATION

RELATED APPLICATIONS

This application claims the benefit of U.S. Provisional Patent Application No. 62/951,413, filed Dec. 20, 2019, and entitled "SIMPLIFIED CONTROL FOR OPTIMIZED HYBRID VEHICLE POWERTRAIN OPERATION," the entire contents of which are incorporated herein by reference.

BACKGROUND

This disclosure relates to systems and methods for controlling operation of the powertrain of a hybrid gasoline/electric vehicle. In particular, systems and methods described below relate to systems and methods for controlling the operation of a combustion engine and one or more electric motors to provide motive force for movement of a hybrid vehicle.

SUMMARY

Some embodiments presented below provide a method for calibrating a hybrid vehicle system for simplified control of the powertrain to optimize fuel efficiency of the hybrid vehicle. In particular, the optimization mechanism reduces the optimized control problem to a single degree-of-freedom. Accordingly, during real-time operation of the hybrid vehicle, the system is able to quickly identify and apply optimized operating settings for a particular driver demand and to provide a particular rate of change of the state-of-charge of the battery of the hybrid vehicle.

In one embodiment, the examples described below provide a method for optimized control of a hybrid vehicle powertrain. An electronic controller determines a plurality of operation points for a particular defined vehicle demand. Each operation point defines a set of operating settings including an engine torque for a combustion engine of the hybrid vehicle and a motor torque for an electric motor of the hybrid vehicle. The vehicle demand includes a target vehicle torque and, in some embodiments, a target vehicle speed. The electronic controller then determines a fuel consumption rate and a rate of change of the state-of-charge of a battery of the hybrid vehicle for each of the plurality of operation points. An optimization function is then defined for the particular vehicle demand. The optimization function defines a set of operation points (from the plurality of operation points) that provides a lowest fuel consumption rate for each of the plurality of different values of the rate of change of the state-of-charge.

In another embodiment, the examples described herein provide a hybrid vehicle powertrain optimization system. The system includes an electronic controller configured to determine a plurality of operation points each capable of operating the hybrid vehicle powertrain in accordance with a particular defined vehicle demand. Each operation point defines a set of operating settings including an engine torque for a combustion engine and a motor torque for an electric motor of the hybrid vehicle. The vehicle demand includes a target vehicle torque. The controller is also configured to determine a fuel consumption rate and a rate of change of the state-of-charge of a battery of the hybrid vehicle for each of the plurality of operation points. The electronic controller then defines an optimization function for the particular defined vehicle demand. The optimization function defines a set of operation points (from the plurality of operation points) that each provide a lowest fuel consumption rate for each of a plurality of different values of the rate of change of the state-of-charge.

In some embodiments, the electronic controller configured to define the optimization function is part of an external computer system and is further configured to transmit the optimization function to a vehicle controller of the hybrid vehicle for use by the vehicle controller in controlling the operation of the hybrid vehicle powertrain. In other embodiments, the electronic controller is the vehicle controller and is configured to both define the optimization function and use the optimization function to control the operation of the hybrid vehicle powertrain.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
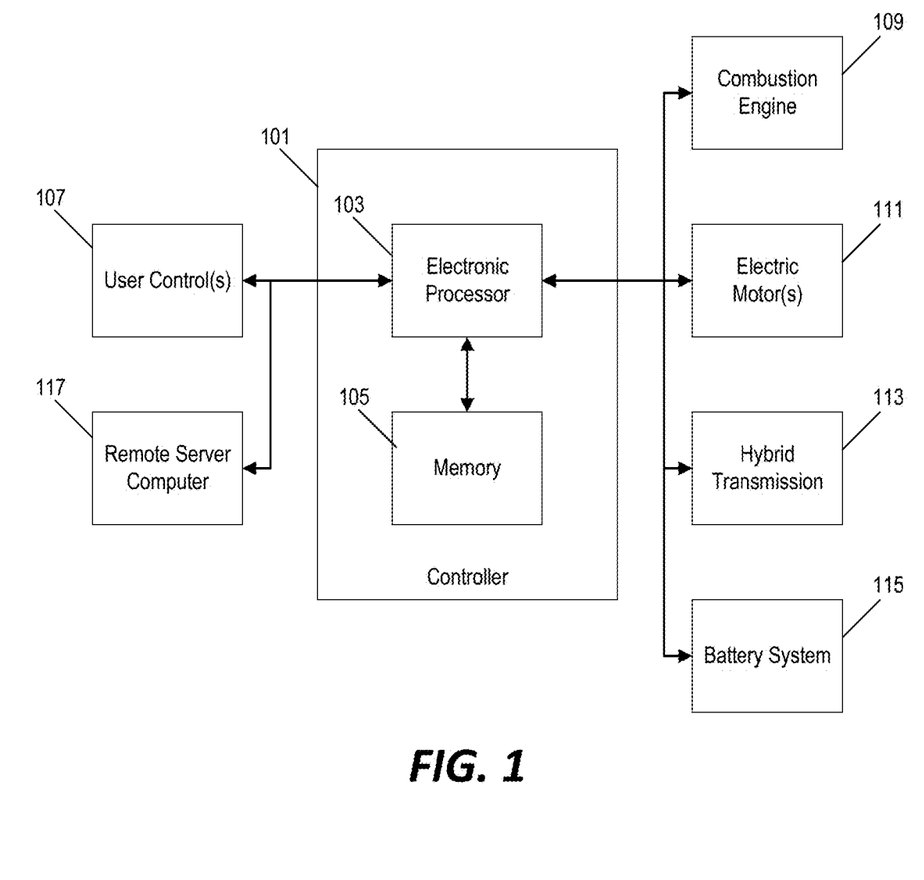
FIG. 1 is a block diagram of a control system for a hybrid gasoline/electric vehicle according to one embodiment.

FIG. 1 illustrates an example of a control system for a hybrid gasoline/electric vehicle. A controller 101 includes an electronic processor 103 and a non-transitory computer-readable memory 105. The memory 105 stores data and instructions that are executed by the electronic processor 103 to provide the functionality of the controller 101 including, for example, the functionality described herein. The controller 101 is communicative coupled to various different vehicle systems and components including, for example, one or more user input controls 107, a combustion engine 109, one or more electric motors 111, a hybrid transmission 113, and a battery system 115. In some implementations, the controller 101 is also configured to communicate with a remote computer system 117, for example, via a wireless communication link.

The user controls 107 are operated by a driver of the vehicle to control the operation of the vehicle. The user controls 107 may include, for example, an accelerator pedal, a brake pedal, and a steering wheel. The user controls 107 are configured to transmit a signal to the controls 101 indicative of a user control input received by manipulation of the user control 107. For example, the user control 107 may include an accelerator pedal and may be configured to transmit a signal to the controller 101 indicative of a degree to which the accelerator pedal has been depressed by the driver of the vehicle.

The controller 101 is configured to control various vehicle system to provide motive power for moving the vehicle in response to the signals from the user controls 107. The combustion engine 109 burns gasoline to provide motive force to the vehicle and to generate electricity to charge the batteries of the battery system 115. The electric motors 111 draw electric power from the battery system 115 to provide motive force to the vehicle. In some implementations, the electric motors 111 may also be configured to generate electricity to charge the batteries of the battery system 115 by regenerative braking. The hybrid transmission 113 is configured to regulate the proportion of motive power provided to the powertrain of the vehicle by the combustion engine 109 and the electric motors 111 in response to signals received from the controller 111.

The controller 101 is configured to determine an appropriate "driver demand" for the hybrid vehicle including, for example, a target vehicle speed and a target vehicle torque based at least in part on the signal received from the user controls 107 (e.g., the accelerator pedal). The controller 101 then determines appropriate operating settings for the combustion engine 109, the electric motors 111, and the hybrid transmission 113 to operate the vehicle according to the driver demand. Operating settings may include, for example, an engine speed and engine torque for the combustion engine 109, a motor speed and motor torque for each electric motor 111, and a transmission setting for the hybrid transmission 113. The controller 101 may also be configured to monitor the battery system 115, to determine a current state-of-charge of the battery system 115, and to further control the operating settings of the vehicle systems in order to provide an appropriate change in the state-of-charge of the battery system 115.

Many different combinations of engine torque and motor torque can be applied in order to provide the motive power to the vehicle powertrain necessary to operate the vehicle according to the driver demand input. The same vehicle torque can be achieved by coordinatedly adjusting the proportion of torque provided to the powertrain by the engine 109 and the electric motor 111. For example, the combustion engine 109 may be operated at an engine torque setting that is capable of providing the full amount of vehicle torque required by the driver demand input. In this first case, the electric motor 111 would not need to provide any portion of the torque and the state-of-charge of the battery system 115 could remain constant (i.e., Δ SOC=0). Conversely, the electric motors 111 may also be operated at a motor torque setting that is capable of providing the full amount of vehicle torque required by the driver demand input. In this second case, the combustion engine 109 could be powered down such that no gasoline is burned. However, doing so would cause the state-of-charge of the battery system 115 to decrease because electric power is drawn from the battery system 115 to provide the full motive force of the vehicle.

In order to provide a steady state-of-charge (e.g., ΔSOC=0) while operating the electric motors 111 at a setting capable of providing the full vehicle torque required by the driver demand input, the combustion engine 109 could be operated at a relatively low level to generate electricity to charge the battery system 115. Accordingly, for each different rate of change to the state-of-charge of the battery system 115, multiple different combinations of engine and motor operating settings can be applied to achieve a target vehicle performance (according to a driver demand input). However, the different combinations of engine and motor operating settings will also affect the rate at which fuel is consumed by the combustion engine 109.

To improve fuel efficiency of the hybrid vehicle, the controller 101 can be calibrated to apply optimized operating settings based on the driver demand input and a target rate of change of the state-of-charge. However, because vehicle system can require a relatively large number of operating settings, the computational complexity required to optimize all of the operating settings concurrently can be overly cumbersome and impractical for implementing on the controller 101 of a vehicle system. The systems and methods described below simplify the optimization to provide optimized control of the hybrid vehicle powertrain with limited computational resource requirements. In particular, systems and methods described herein provide a modeling framework that characterizes the hybrid electric vehicle (HV) control problem with the output as the fuel rate, the input as the battery power, and the state as the battery state-of-charge (SOC). The control problem is then simplified to a one degree-of-freedom (DoF) problem. The proposed optimization framework characterizes the optimal control of each component given any driver demand (i.e., a combination of target vehicle speed and target vehicle torque). This approach reduces the computational burden during operation of the hybrid vehicle.

Figure 2:
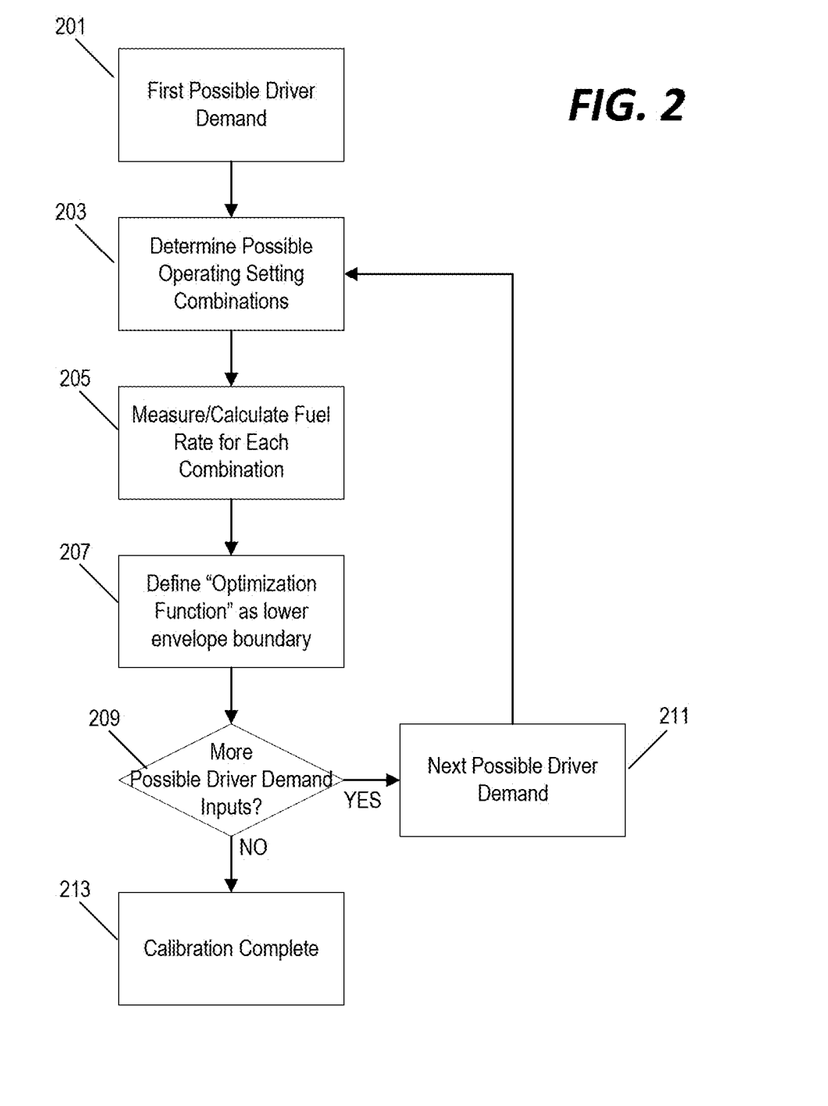
FIG. 2 is a flowchart of a method for calibrating the hybrid gasoline/electric vehicle of FIG. 1 for optimized powertrain control.

FIG. 2 illustrates an example of a method for calibrating a hybrid vehicle for optimized powertrain operation. The method applies an optimization to a plurality of different possible driver demand inputs (e.g., different combinations of target vehicle speed and target vehicle torque). For the first of the plurality of possible driver demand inputs (step 201), the controller 101 determines a plurality of different possible combinations of operating settings that can provide vehicle performance required by the driver demand input for each of a plurality of different Δ SOC rates (step 203). The controller 101 then determines a fuel rate for each possible combination of operating settings (step 205), for example, by calculation using a vehicle model or by operating the vehicle under each combination of operating settings and measuring the fuel rate. After fuel rate is measured or calculated for each possible combination of operating settings, the controller 101 determines an optimization function that defines an optimized operation point for the particular driver demand input for each of the plurality of different Δ SOC rates (step 207).

Once the optimization function is determined for the first possible driver demand input, the controller 101 repeats the optimization (steps 203, 205, 207) for the next possible drive demand input (step 211). After an optimization function has been determined for each of the plurality of possible driver demand inputs (step 209), the calibration process is complete (step 213). In some implementations, the optimization/calibration process of FIG. 2 may be performed by the controller 101 while operating the hybrid vehicle. In other implementations, the method of FIG. 2 is performed by a remote computer system 117 and the updated set of optimization functions is transmitted to the controller 101.

Figure 3:
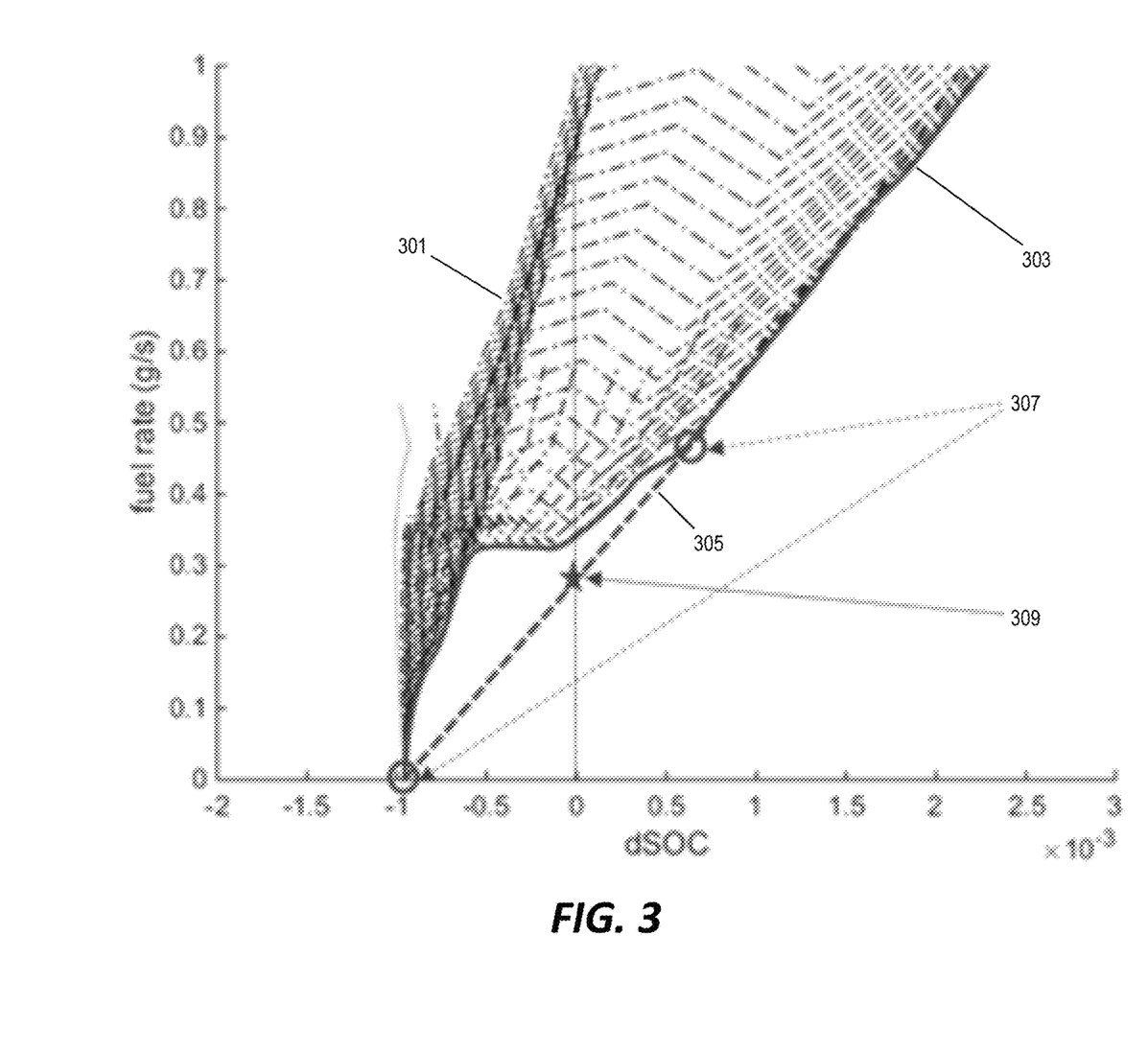
FIG. 3 is a graph of operation points for operating the hybrid gasoline/electric vehicle of FIG. 1 at a particular driver demand and the corresponding fuel rate and change in state-of-charge for each operation point.

To further illustrate the method of FIG. 2, FIG. 3 provides an example of a graph of various different operation points for the vehicle at one possible driver demand input. The dashed lines 301 indicate the Δ SOC and fuel rate for each of the plurality of possible operation points. Each operation point in the graph of FIG. 3 is indicative of a different combination of operating settings that can be applied to the vehicle to achieve the vehicle performance required by the driver demand input. The solid line 303 demarks the lower boundary of the envelope defined by the operation points 301. The solid line 303 indicates the operation point (i.e., a particular combination of operating settings) that will provide the lowest fuel rate (i.e., the highest fuel efficiency) at each Δ SOC rate. In some implementations of the method of FIG. 2, the solid line 303 defines the optimization function for the particular driver demand input (i.e., step 207 of FIG. 2). (The components of the graph of FIG. 2 labeled 305, 307, and 309 are discussed below in reference to another example.)

Figure 4:
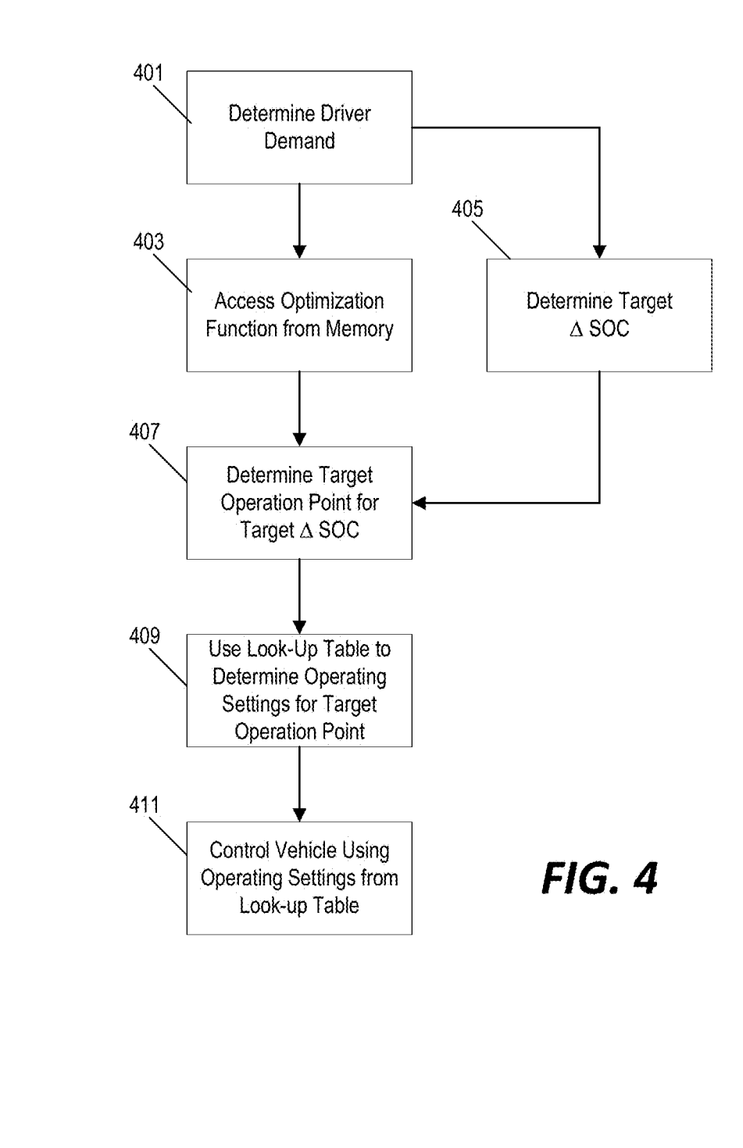
FIG. 4 is a flowchart of a method for controlling the operation of the hybrid gasoline/electric vehicle of FIG. 1 that has been calibrated according to the method of FIG. 2.

FIG. 4 illustrates an example of a method for operating a hybrid vehicle that has been calibrated using the method of FIG. 2. First, the controller 101 determines the driver demand based, for example, on the input signals received from the user controls 107 (step 401). The controller 101 also determines a target Δ SOC rate for operating the vehicle (step 403). In some implementations, the target Δ SOC rate is determined based at least in part on the received driver demand while, in other implementations, other optimization mechanisms are implemented by the controller 101 for determining an appropriate Δ SOC rate for operation of the vehicle.

The controller 101 accesses the optimization function for the determined driver demand (step 405). In some implementations, the optimization function is provided in the form of a mathematical equation or a graph format (as illustrated in FIG. 3) while, in other implementations, the optimization function is provided in the form of a look-up table stored to the memory 105. Using the optimization function for the determined driver demand, the controller 101 determines a target operation point for the target Δ SOC rate (step 407). Once the target operation point is determined, the controller 101 uses a look-up table to access the set of operating settings for the target operation point (step 409) and operates the vehicle systems (e.g., the combustion engine 109, the electric motors 111, and the hybrid transmission 113) according to the accessed set of operating settings for the target operation point (step 411).

Figure 5:
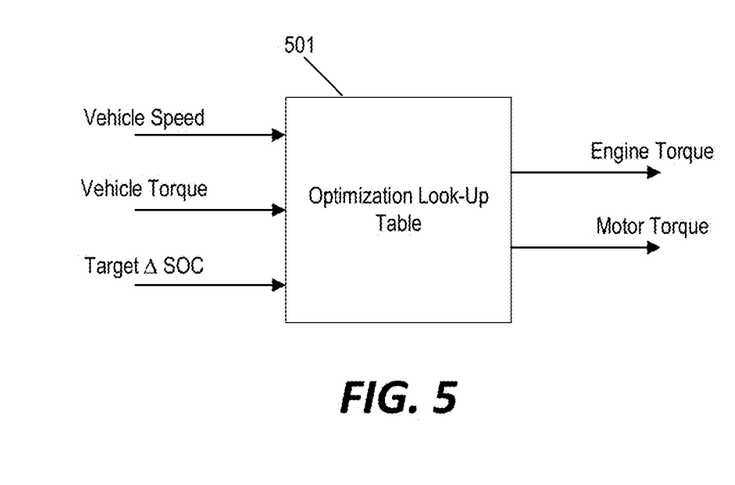
FIG. 5 is a block diagram of a look-up table used to implement the method of FIG. 4.

Because the complexity of the optimization routine has been simplified as discussed above in reference to FIGS. 2 and 3, the method for operating the vehicle can be implemented by a single look-up table. For example, as illustrated in FIG. 5, the memory 105 can be configured to store a look-up table 501 that is configured to receive as inputs a target vehicle speed, a target vehicle torque, and a target Δ SOC rate and to produce as outputs a complete set of operating settings.

FIGS. 2 and 4 provide examples of mechanisms for calibrating a hybrid vehicle and for operating the hybrid vehicle that is configured to use another mechanism (e.g., another optimization routine) to determine an appropriate Δ SOC rate. However, the mechanism for simplifying the optimized operation points for the hybrid vehicle illustrated by the solid line 303 in FIG. 3 can be implemented in other specific methods and systems. For example, FIG. 6 illustrates a method that is adapted to further simplify optimization of powertrain control by also enabling the controller 101 to determine an appropriate Δ SOC rate for optimized vehicle operation.

Figure 6:
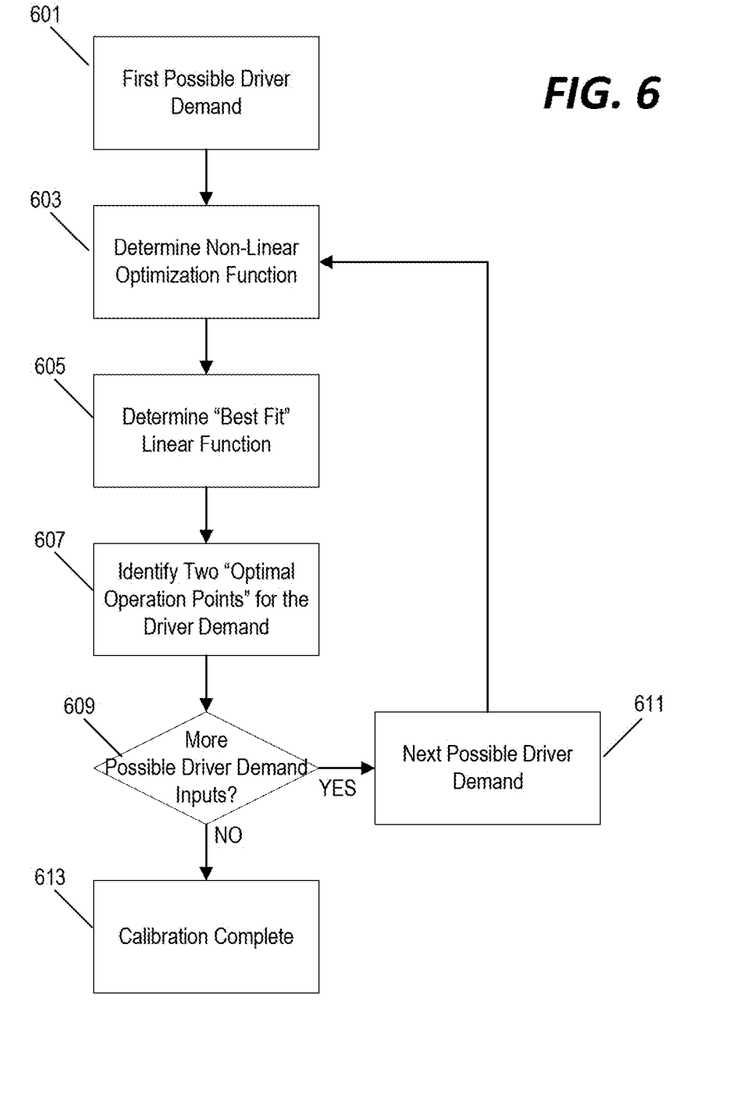
FIG. 6 is a flowchart of an alternative method for calibrating the hybrid gasoline/electric vehicle of FIG. 1 to provide a reduced set of optimized operation points for each possible driver demand input.

Like the method of FIG. 2, the calibration method of FIG. 6 repeats a series of optimization steps for each of a plurality of different possible driver demand inputs. The method begins with a first possible driver demand input (e.g., a combination of a target vehicle speed and a target vehicle torque) (step 601). The controller 101 determines a non-linear optimization function for the first possible driver demand input using the same mechanism described above in reference to FIG. 2 (e.g., the solid line 303 of FIG. 3) (step 603). Next, the controller 101 applies a "best fit" approach to determine a linear optimization function based on the non-linear optimization function (step 605).

In the example of FIG. 3, the non-linear optimization function defined by the solid line 303 provides a relatively steep increase in fuel rate from the Δ SOC rate of −1 through −0.5 before levelling off to a near constant fuel rate as the Δ SOC rate increases to zero. As the Δ SOC rate increases above 0, the fuel rate increase to Δ SOC rate increase becomes nearly linear. Accordingly, the best fit linear function for the example of FIG. 3 is the dashed line 305, including its extended portion, which is below the non-linear optimization curve 303. The resulted average fuel consumption value (when A SOC=0), indicated by star 309 as the "optimal average point", is the minimum fuel consumption for this driver demand input.

Due to system dynamics, the linear optimization function indicative by the dashed line 305 includes a portion between points 307 where the linear optimization curve extends below the envelope of operation points that can be used to provide the vehicle performance required by the driver demand input. In some implementations, the controller 101 is configured to identify the operation points on either end of this non-overlapping segment of the linear optimization function (i.e., points 307) and to define those two operation points as the optimal operation points for the particular driver demand input (step 607).

After identifying the two optimal operation points for the first possible driver demand demand input, the controller 101 repeats the process in order to determine a reduced set of two optimal operation points for the next possible driver demand input (step 611). After a reduced set of two optimal operation points is determined for each of the plurality of possible driver demand inputs (step 609), the calibration process is complete (step 613).

Figure 7:
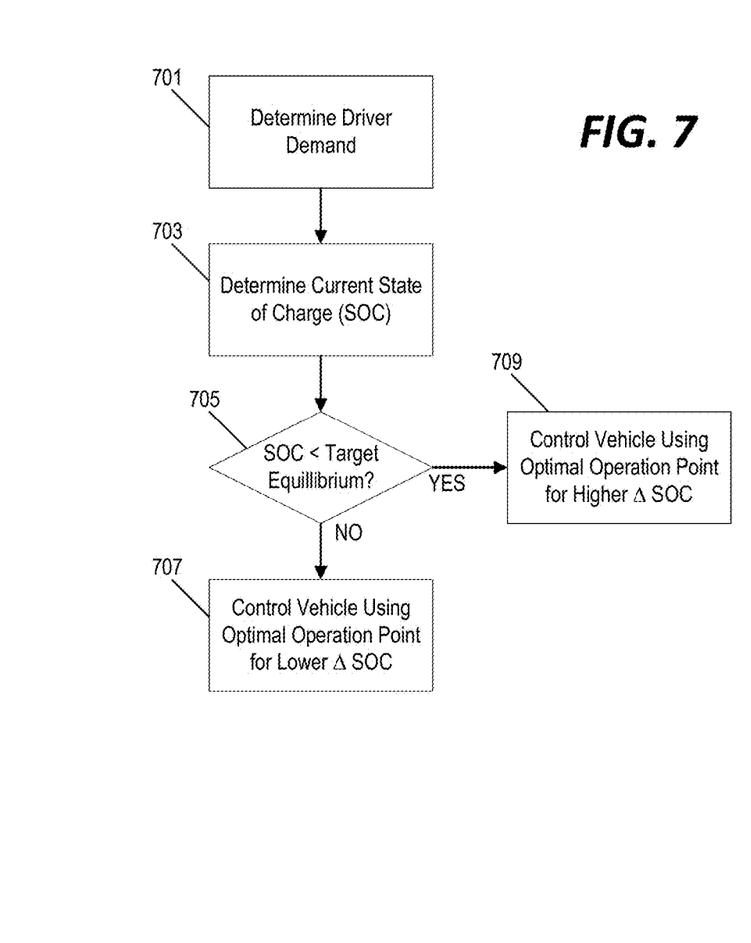
FIG. 7 is a flowchart of a method for operating the hybrid gasoline/electric vehicle of FIG. 1 that has been calibrated according to the method of FIG. 6.

FIG. 7 illustrates a method for controlling the operation of the powertrain of a hybrid vehicle that has been calibrated by the method of FIG. 6. As discussed above, the calibration method of FIG. 6 has defined a set of two optimal operation points for each of a plurality of different possible driver demand inputs. For many of the possible driver demand inputs, one of the optimal operation points will correspond to a Δ SOC rate that is less than zero while the other corresponds to a Δ SOC rate that is greater than zero. Accordingly, applying the first optimal operation point will decrease the charge on the battery system 115 while applying the second optimal operation point will increase the charge on the battery system 115.

In the method of FIG. 7, the controller 101 begins by determines a driver demand (e.g., a target vehicle speed and a target vehicle torque) based on a signal from the user control 107 (step 701). The controller 101 also determines a current state-of-charge of the battery system (step 703) and compares the current state-of-charge to a target equilibrium threshold (step 705). The target equilibrium threshold indicates the state-of-charge that the battery system 115 is configured to maintain during operation of the hybrid vehicle. If the state-of-charge of the battery system 115 at or above the target equilibrium threshold, the controller 101 controls the vehicle using the optimal operation point for the driver demand input with the lower Δ SOC rate (step 707). Controlling the vehicle using this first optimal operation point will cause the vehicle to rely more on the electric motors 111 and, accordingly, will cause a decrease in the state-of-charge of the battery system 115. Conversely, if the current state-of charge is below the equilibrium threshold, the controller 101 will control the vehicle using the second optimal operation point (step 709). Using this second optimal operation point will provide the necessary vehicle performance required by the driver demand input while also increasing the charge of the battery system 115.

Figure 8:
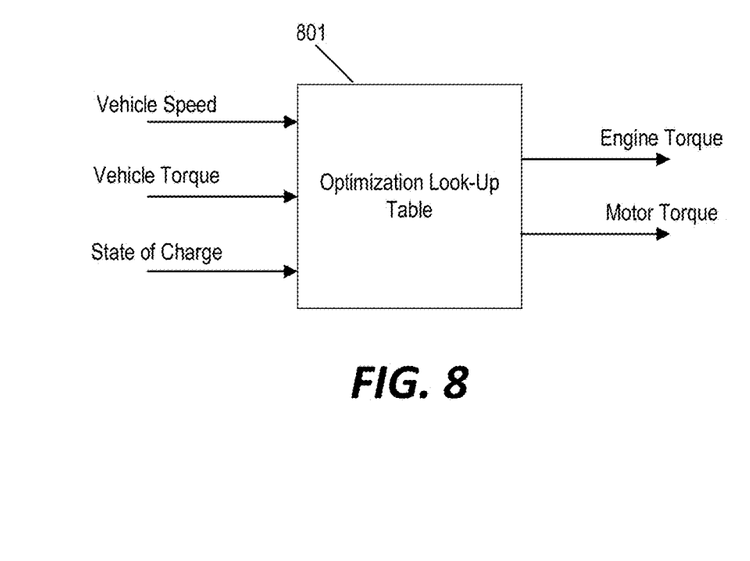
FIG. 8 is a block diagram of a look-up table used to implement the method of FIG. 7.

Like the first example (described in reference to FIGS. 2, 4, and 5 above), due to the simplified optimization of FIG. 6, the optimized control of the vehicle described in reference to FIG. 7 can be implemented using a look-up table stored to the memory 105. As illustrated in FIG. 8, the look-up table 801 can be configured to receive as inputs a target vehicle speed, a target vehicle torque, and an indication of whether the current state-of-charge exceeds the target equilibrium threshold. Based on these inputs, the look-up table 801 produces as outputs a complete set of operating settings for optimized control of the vehicle including, for example, a target engine torque setting and a target motor torque setting.

Accordingly, the systems and methods described above provide, among other things, a method for calibrating a hybrid gasoline/electric vehicle for simplified optimized performance by defining an optimization function with one degree-of-freedom. Other features and advantages are set forth in the following claims.

What is claimed is:

1. A method for optimized control of a hybrid vehicle powertrain, the method comprising:
   determining, by an electronic controller, a plurality of operation points for a vehicle demand,
      wherein each operation point defines a set of operating settings that, when applied to the hybrid vehicle powertrain, will cause the vehicle to perform according to the vehicle demand, wherein the set of operating settings includes an engine torque for a combustion engine of the hybrid vehicle and a motor torque for an electric motor of the hybrid vehicle, and
      wherein the vehicle demand includes a target vehicle torque;
   determining, by the electronic controller, a fuel consumption rate and a rate of change of the state-of-charge of a battery of the hybrid vehicle for each of the plurality of operation points; and
   defining an optimization function for the hybrid vehicle, wherein the optimization function defines a set of operation points from the plurality of operation points that each provides a lowest fuel consumption rate for a different value of a plurality of values of the rate of change of the state-of-charge.

2. The method of claim 1, further comprising operating the hybrid vehicle based on the optimization function by
   determining a target rate of change of the state-of-charge,
   identifying an operation point from the optimization function for the target rate of change of the state-of-charge, and
   operating the combustion engine and the electric motor based on the operating settings defined by the identified operation point.

3. The method of claim 1, further comprising generating an optimization look-up table based on the optimization function, wherein the optimization look-up table is configured to receive as input a value indicative of a target rate of change of the state-of-charge and to produce as an output a set of operating settings for an operation point defined by the optimization function for the target rate of change of the state-of-charge.

4. The method of claim 1, further comprising defining a plurality of optimization functions, wherein each optimization function of the plurality of optimization functions defines a set of operation points for a different vehicle demand.

5. The method of claim 4, further comprising operating the hybrid vehicle based on the plurality of optimization functions by
   receiving, by the electronic controller, a signal indicative of a current vehicle demand,
   identifying an optimization function of the plurality of optimization functions corresponding to the current target vehicle demand,
   determining a target rate of change of the state-of-charge,
   identifying an operation point for the target rate of change of the state-of-charge based on the optimization function corresponding to the current target vehicle demand, and
   operating the combustion engine and the electric motor based on the operating settings defined by the identified operation point to provide vehicle performance in accordance with the current vehicle demand and an actual rate of change of the state-of-charge in accordance with the target rate of change of the state-of-charge.

6. The method of claim 4, further comprising generating an optimization look-up table based on the plurality of optimization functions, wherein the optimization look-up table is configured to
   receive as input a value indicative of a target rate of change of the state-of-charge and one or more values indicative of a current vehicle demand, and
   produce as an output a set of operating settings for an operation point defined by the optimization function corresponding to the current vehicle demand for the target rate of change of the state-of-charge.

7. The method of claim 1, wherein determining the fuel consumption rate and the rate of change of the state-of-charge of a battery of the hybrid vehicle for each of the plurality of operation points includes
   operating the hybrid vehicle based on the operating settings defined by each operation point of the plurality of operation points to provide vehicle performance in accordance with the vehicle demand, and
   measuring an actual fuel consumption rate while operating the hybrid vehicle based on the operating settings defined by each operation point of the plurality of operation points.

8. The method of claim 1, wherein defining the optimization function for the vehicle demand includes
   plotting each operation point of the plurality of operation points in a two-dimensional graph based on the fuel consumption rate of each operation point as a function of the rate of change of the state-of-charge, and defining the optimization function as a line defining a lower boundary of an area of the graph occupied by the plurality of operation points.

9. The method of claim 8, wherein defining the optimization function for the vehicle further includes determining a mathematical equation defining the line of the optimization function from the two-dimensional graph.

10. The method of claim 1, wherein determining, by the electronic controller, the plurality of operation points for the vehicle demand includes determining by the electronic controller of an external computer system, the plurality of operation points for the vehicle demand,
the method further comprising transmitting the optimization function from the external computer system to a vehicle controller of the hybrid vehicle for use by the vehicle controller in operating the powertrain of the hybrid vehicle.

11. A hybrid vehicle powertrain optimization system comprising an electronic controller configured to:
determine a plurality of operation points each capable of operating a hybrid vehicle powertrain to provide vehicle performance in accordance with a vehicle demand,
wherein each operation point defines a set of operating settings including an engine torque for a combustion engine of the hybrid vehicle and a motor torque for an electric motor of the hybrid vehicle, and
wherein the vehicle demand includes a target vehicle torque;
determine a fuel consumption rate and a rate of change of the state-of-charge of a battery of the hybrid vehicle for each of the plurality of operation points; and
define an optimization function for the hybrid vehicle, wherein the optimization function defines a set of operation points from the plurality of operation points that each provide a lowest fuel consumption rate for a different value of a plurality of values of the rate of change of the state-of-charge.

12. The system of claim 11, further comprising a vehicle controller, wherein the vehicle controller is configured to operate the hybrid vehicle based on the optimization function by
determining a target rate of change of the state-of-charge,
identifying an operation point from the optimization function for the target rate of change of the state-of-charge, and
operating the combustion engine and the electric motor based on the operating settings defined by the identified operation point.

13. The system of claim 11, wherein the electronic controller is further configured to generate an optimization look-up table based on the optimization function, wherein the optimization look-up table is configured to receive as input a value indicative of a target rate of change of the state-of-charge and to produce as an output a set of operating settings for an operation point defined by the optimization function for the target rate of change of the state-of-charge.

14. The system of claim 11, wherein the electronic controller is further configured to define a plurality of optimization functions, wherein each optimization function of the plurality of optimization functions defines a set of operation points for a different vehicle demand.

15. The system of claim 14, further comprising a vehicle controller, wherein the vehicle controller is further configured to operate the hybrid vehicle based on the plurality of optimization functions by
receiving a signal indicative of a current vehicle demand,
identifying an optimization function of the plurality of optimization functions corresponding to the current target vehicle demand,
determining a target rate of change of the state-of-charge,
identifying an operation point for the target rate of change of the state-of-charge based on the optimization function corresponding to the current target vehicle demand, and
operating the combustion engine and the electric motor based on the operating settings defined by the identified operation point to provide vehicle performance in accordance with the current vehicle demand and an actual rate of change of the state-of-charge in accordance with the target rate of change of the state-of-charge.

16. The system of claim 14, wherein the electronic controller is further configured to generate an optimization look-up table based on the plurality of optimization functions, wherein the optimization look-up table is configured to
receive as input a value indicative of a target rate of change of the state-of-charge and one or more values indicative of a current vehicle demand, and
produce as an output a set of operating settings for an operation point defined by the optimization function corresponding to the current vehicle demand for the target rate of change of the state-of-charge.

17. The system of claim 11, wherein the electronic controller is configured to determine the fuel consumption rate and the rate of change of the state-of-charge of a battery of the hybrid vehicle for each of the plurality of operation points by
operating the hybrid vehicle based on the operating settings defined by each operation point of the plurality of operation points to provide vehicle performance in accordance with the vehicle demand, and
measuring an actual fuel consumption rate while operating the hybrid vehicle based on the operating settings defined by each operation point of the plurality of operation points.

18. The system of claim 11, wherein the electronic controller is configured to define the optimization function for the vehicle demand by
plotting each operation point of the plurality of operation points in a two-dimensional graph based on the fuel consumption rate of each operation point as a function of the rate of change of the state-of-charge, and
defining the optimization function as a line defining a lower boundary of an area of the graph occupied by the plurality of operation points.

19. The system of claim 11, further comprising an external computer system including the electronic controller, wherein the external computer system is configured to transmit the optimization function to a vehicle controller for use by the vehicle controller in operating the powertrain of the hybrid vehicle.

20. The system of claim 11, wherein the electronic controller includes a vehicle controller.

* * * * *